US007806572B2

(12) United States Patent
McFadden et al.

(10) Patent No.: US 7,806,572 B2
(45) Date of Patent: Oct. 5, 2010

(54) HEADLAMP ASSEMBLY WITH ISOLATED OPTICS CHAMBER

(75) Inventors: James R. McFadden, Oxford, MI (US); Chad D. Lambert, Belleville (CA)

(73) Assignee: Magna International Inc., Ontario (CA)

( * ) Notice: Subject to any disclaimer, the term of this patent is extended or adjusted under 35 U.S.C. 154(b) by 410 days.

(21) Appl. No.: 11/729,693

(22) Filed: Mar. 29, 2007

(65) Prior Publication Data

US 2008/0239743 A1 Oct. 2, 2008

(51) Int. Cl.
*B60Q 1/00* (2006.01)

(52) U.S. Cl. ....................... 362/538; 362/294; 362/373; 362/475; 362/547; 362/545

(58) Field of Classification Search ................. 362/475, 362/507, 538, 543–548, 294, 345, 373, 580, 362/218, 264; 313/25, 26
See application file for complete search history.

(56) References Cited

U.S. PATENT DOCUMENTS 2,317,035 A * 4/1943 Dana ........................... 313/25
4,733,335 A * 3/1988 Serizawa et al. ............ 362/503
4,891,541 A * 1/1990 Szekacs ....................... 313/25
5,070,432 A * 12/1991 Kitazumi et al. ............ 362/538
5,126,924 A * 6/1992 Watanabe ................... 362/538
5,353,204 A * 10/1994 Kawamura .................. 362/538
6,367,949 B1 * 4/2002 Pederson .................... 362/240
7,030,543 B2 * 4/2006 Galvez et al. ................. 313/25
7,075,112 B2 7/2006 Roberts et al.
7,325,955 B2 * 2/2008 Lucas et al. ................. 362/545
2004/0085779 A1 * 5/2004 Pond et al. .................. 362/516
2005/0213324 A1 * 9/2005 Chen .......................... 362/249
2006/0215416 A1 9/2006 Lucas et al.
2007/0091632 A1 4/2007 Glovatsky et al.

* cited by examiner

*Primary Examiner*—Sandra L O'Shea
*Assistant Examiner*—Danielle Allen
(74) *Attorney, Agent, or Firm*—Warn Partners, P.C.; Marc Luddy

(57) ABSTRACT

A headlamp assembly which employs semiconductor light sources includes an optics chamber that is isolated from the surrounding environment to prevent the ingress of water, dirt, or other foreign materials into the optics chamber. At the same time, the headlamp assembly includes a plenum chamber, separated from the optics chamber, and airflow through the plenum chamber provides the necessary cooling for the semiconductor light sources.

15 Claims, 1 Drawing Sheet

HEADLAMP ASSEMBLY WITH ISOLATED OPTICS CHAMBER

FIELD OF THE INVENTION

The present invention relates to a headlamp assembly with an isolated optics chamber. More specifically, the present invention relates to a headlamp assembly employing semiconductor light sources located in a sealed optics chamber wherein cooling of the semiconductor light sources primarily occurs outside of the optics chamber.

BACKGROUND OF THE INVENTION

Semiconductor light sources, such as light emitting diodes (LEDs) or the like, have recently achieved performance levels which allow these light sources to used to construct automotive lighting system components, such as headlamps.

While semiconductor light sources offer a variety of advantages over incandescent, gas discharge and other conventional headlamp light sources, they also offer different challenges in their use.

In particular, to obtain sufficient levels of light from the semiconductor light sources, the light sources typically must be operated at, or near, their maximum recommended operating conditions. At such operating conditions, to obtain desired operating lifetimes for the semiconductor light sources, it is necessary to provide a significant amount of cooling to the semiconductor junctions of the semiconductor light sources.

Further, the optical pathway and components of the headlamps must be carefully designed and constructed to make efficient use of the light produced by the semiconductor light sources, as such light sources generally do not produce an excess of light.

Due to the wide range of environmental conditions in which an automotive lighting system must operate, it can be difficult to achieve the necessary cooling of the semiconductor light sources without potentially impacting the efficiency of the optical pathway and components.

SUMMARY OF THE INVENTION

It is an object of the present invention to provide a novel headlamp assembly with an isolated optics chamber.

According to a first aspect of the present invention, there is provided a headlamp assembly, comprising: a base member; a transparent cover member joined to the base member; a light engine housing including: a light engine employing semiconductor light sources; a lens, the lens being operable to focus light from the semiconductor light sources into a desired beam pattern; a heat rejection structure extending outside of the housing to remove heat from the semiconductor light sources; a mounting flange and flexible bellows moveably mounting the light engine housing with respect to the base member, wherein the base member, transparent cover member and light engine housing form an optics chamber isolated from the surrounding environment; and a rear member connected to the base member and the transparent cover member to define a plenum chamber about the heat rejection structure, the plenum chamber including at least one inlet to admit cooling air to the plenum chamber and at least one outlet to exhaust cooling air from the plenum chamber.

The present invention provides a headlamp assembly, which employs semiconductor light sources, includes an optics chamber that is isolated from the surrounding environment to prevent the ingress of water, dirt, or other foreign materials into the optics chamber. At the same time, the headlamp assembly includes a plenum chamber, separated from the optics chamber, and airflow through the plenum chamber provides the necessary cooling for the semiconductor light sources.

BRIEF DESCRIPTION OF THE DRAWINGS

Preferred embodiments of the present invention will now be described, by way of example only, with reference to the attached FIGURE, wherein.

DETAILED DESCRIPTION OF THE INVENTION

Figure 1:
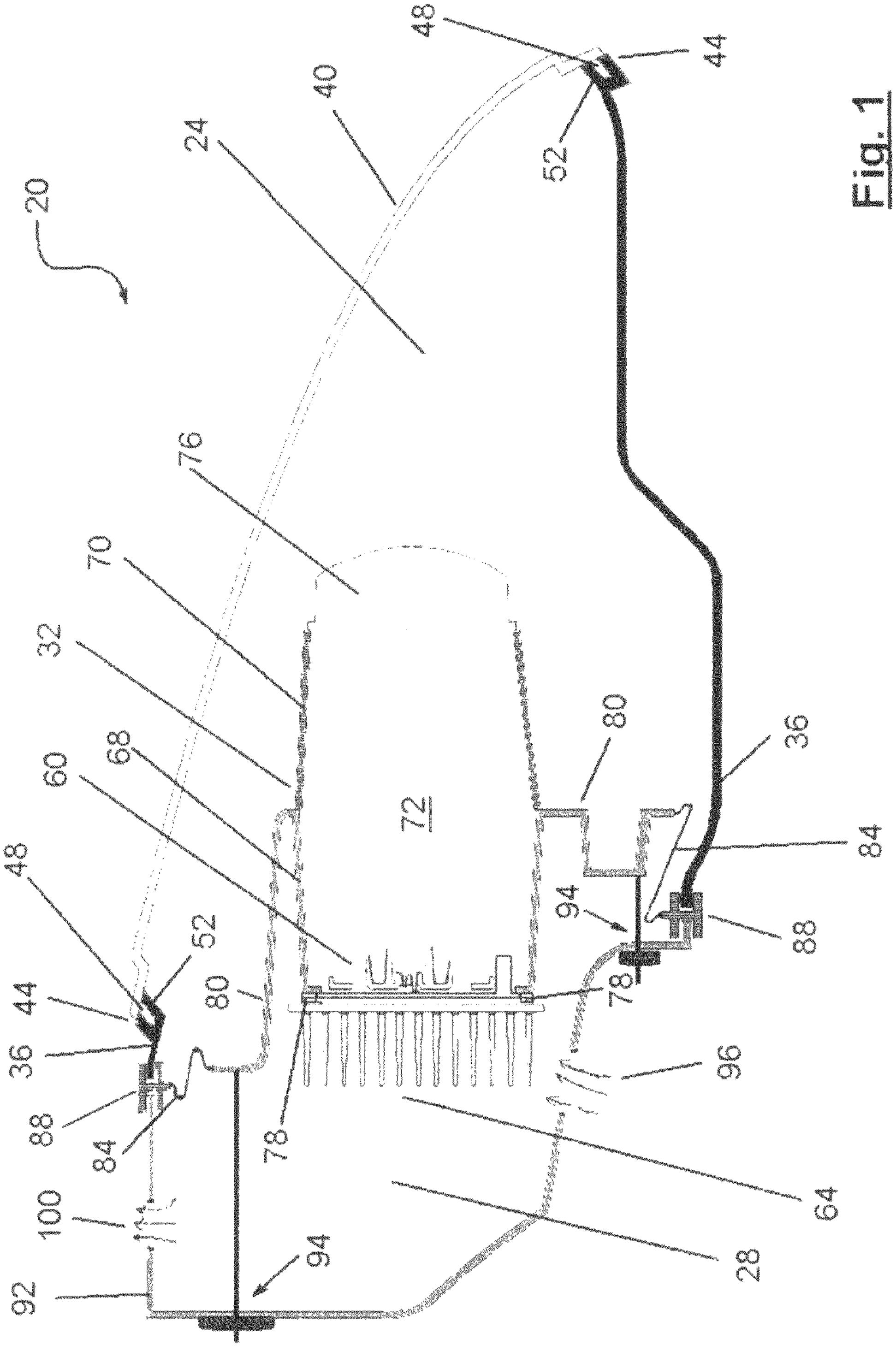
FIG. 1 shows a side cross section of a headlamp assembly in accordance with the present invention.

A headlamp assembly in accordance with the present invention is indicated generally at 20 in FIG. 1. As can be seen in the FIGURE, assembly 20 comprises an optics chamber 24 and a plenum chamber 28 which are separated by a light generator 32, described below.

Optics chamber 24 is formed from a base member 36 and a transparent cover member 40. Base member 36 is preferably opaque and can be formed of any suitable material, such as a polycarbonate and by any suitable manufacturing process, such as injection molding. Cover member 40 is transparent and can be formed of any suitable material, such as clear polycarbonate with a suitable protective coating, by any suitable manufacturing process such as injection molding cover member 40 and applying the protective coating by spraying.

The connection 44 of base member 36 to cover member 40 is preferably such that a seal is formed at connection 44, preventing the ingress of water, dirt or other foreign materials through connection 44 into optic chamber 24. In the illustrated embodiment, cover member 40 includes a flange 48 which is received in a slot 52 in base member 36 to form connection 44 and flange 48 can be glued, sonic welded or otherwise affixed into slot 52 to complete connection 44.

Light generator 32 comprises a light engine 60, employing semiconductor light sources such as white LEDs, to produce the light for headlamp assembly 20. Light engine 60 includes a plurality of semiconductor light sources (not shown) mounted on the side of light engine 60 facing cover member 40 and further includes a heat rejection structure 64 on the side of light engine 60 opposite the side on which the semiconductor light sources are mounted. Heat rejection structure 64 is in thermal contact with the semiconductor light sources of light engine 60 and is operable to assist in the removal of waste heat from those light sources. In the illustrated embodiment, heat rejection structure 64 is a set of cooling fins although any other suitable heat rejection structure, as would occur to those of skill in the art, can be employed.

Light generator 32 further comprises a light engine housing 68, to which light engine 60 is mounted and a lens carrier 70 which is joined to light engine housing 68. Housing 68 and lens carrier 70 define a closed volume 72 which has light engine 60 at one end and a lens 76 at the opposite end.

Lens 76 is designed and positioned with respect to light engine 60 such that light from the semiconductor light sources on light engine 60 is formed into desired low beam and/or high beam patterns by lens 76. Light engine 60 is mounted to housing 68 with an appropriate gasket 78 or sealing compound, or both, such that the ingress of water, dirt or other foreign materials into closed volume 72 via light engine 60 is inhibited.

Housing 68 further includes a flange 80 which extends from housing 68 and which is connected to the inner edge of a bellows 84, formed of rubber or another suitable elastomeric material. The outer edge of bellows 84 is connected to an annular connector member 88 which includes slots to receive joining edges of base member 36 and rear housing 92 to define plenum chamber 28. Similar to base member 36, rear housing 92 is preferably opaque and can be formed of any suitable material, such as polycarbonate and by any suitable manufacturing process, such as injection molding.

Flange 80 is mounted within headlamp assembly 20 by a conventional headlamp aiming mechanism 94, or any other suitable mechanism, which extends from flange 80 to rear housing 92. Aiming mechanism 94 allows light engine 60 and lens 76 to be positioned with respect to rear housing 92 and base member 36, and thus the vehicle in which headlamp assembly 20 is mounted, to aim the formed low beam and/or high beam patterns emitted by headlamp assembly 20. As aiming mechanism 94 is located outside optics chamber 24, the beam patterns formed by headlamp assembly 20 can be aimed and re-aimed, if desired, without the possibility of foreign material entering optics chamber 24.

If desired, flange 80 can further include a cosmetic bezel, not shown, to hide bellows 84 from view through cover member 40.

The connection of base member 36 to connector member 88 and the connection of bellows 84 to connector member 88 are both substantially hermetically sealed connections and thus, optics chamber 24 is substantially hermetically sealed to prevent the ingress of water, dirt or other foreign materials.

Plenum chamber 28, which encloses heat rejection structure 64, is provided with at least one inlet 96 and at least one outlet 100 which allow air to traverse plenum chamber 28 to remove waste heat from heat rejection structure 64. As will be apparent to those of skill in the art, the airflow from inlet 96 to outlet 100 can be forced, by a cooling fan (not shown) and/or by airflows induced by movement of the vehicle or by any other suitable means, or can be passively (convection) driven depending upon the cooling needs of light engine 60.

As will now be apparent to those of skill in the art, the present invention teaches a headlamp assembly 20 which includes an optics chamber 24 that is isolated from the surrounding environment to prevent the ingress of water, dirt, or other foreign materials into the optics chamber 24. Such foreign materials could impair the operation of light engine 60, damaging delicate electronics, and/or could block or reduce the transmission of light produced by the semiconductor light sources of light engine 60 through lens 76 and cover member 40. Any such damage or impairment could prevent headlamp assembly 20 from delivering desired beam patterns and illumination levels. At the same time, headlamp assembly 20 includes a plenum chamber 28, separated from optics chamber 24, and airflow through plenum chamber 28 provides the necessary cooling for the semiconductor light sources of light engine 60.

The above-described embodiments of the invention are intended to be examples of the present invention and alterations and modifications may be effected thereto, by those of skill in the art, without departing from the scope of the invention which is defined solely by the claims appended hereto.

We claim:

1. A headlamp assembly, comprising:

a base member;

a transparent cover member joined to the base member;

a light engine housing including:

a light engine employing semiconductor light sources;

a lens, light from each of the semiconductor light sources operable for passing through said lens such that said lens is operable to focus light from the semiconductor light sources into a desired beam pattern;

a heat rejection structure extending outside of the housing to remove heat from the semiconductor light sources;

a mounting flange and flexible bellows moveably mounting the light engine housing with respect to the base member, wherein the base member, transparent cover member and light engine housing form an optics chamber isolated from the surrounding environment;

a lens carrier joined to said light engine housing, said lens carrier and said light engine housing forming a closed volume within said optics chamber; and a rear member connected to the base member and the transparent cover member to define a plenum chamber about the heat rejection structure, the plenum chamber including at least one inlet to admit cooling air to the plenum chamber and at least one outlet to exhaust cooling air from the plenum chamber.

2. The headlamp assembly of claim 1 further comprising an aiming mechanism outside the optics chamber, the aiming mechanism being operable to position the light engine housing to aim the light beam patterns produced by the headlamp assembly.

3. The headlamp assembly of claim 2 wherein the aiming mechanism extends between the light engine housing and the rear member.

4. A headlamp assembly, comprising:

a base member;

a transparent cover member joined to the base member;

a light engine housing including:

a light engine employing semiconductor light sources;

a lens, light from each of the semiconductor light sources operable for passing through said lens such that said lens is operable to focus light from the semiconductor light sources into a desired beam pattern;

a heat rejection structure extending outside of the housing to remove heat from the semiconductor light sources; and a mounting flange and flexible bellows moveably mounting the light engine housing with respect to the base member, wherein the base member, transparent cover member and light engine housing form an optics chamber isolated from the surrounding environment;

a lens carrier joined to said light engine housing, said lens carrier and said light engine housing forming a closed volume within said optics chamber; and a rear member connected to the base member and the transparent cover member to define a plenum chamber about the heat rejection structure, the plenum chamber including at least one inlet to admit cooling air to the plenum chamber and at least one outlet to exhaust cooling air from the plenum chamber.

5. The headlamp assembly of claim 4 further comprising an aiming mechanism outside the optics chamber, the aiming mechanism being operable to position the light engine housing to aim the light beam patterns produced by the headlamp assembly.

6. A headlamp assembly for a vehicle, comprising:

a light engine housing;

a light engine mounted to said light engine housing, said light engine having a plurality of semiconductor light sources;

an optics chamber surrounding said light engine housing, said optics chamber being isolated from the surrounding environment to prevent the ingress of foreign materials into said optics chamber;

a lens carrier connected to said light engine housing to form a closed volume inside said optics chamber;

a lens mounted on said lens carrier, light from each of the semiconductor light sources operable for passing through said lens such that said lens is operable to focus light produced by said light engine to produce a desired low beam and high beam pattern;

an aiming mechanism operable for positioning said light engine and said lens in a desired position; and a plenum chamber separated from said optics chamber, wherein airflow through the plenum chamber provides cooling for said light engine.

7. The headlamp assembly for a vehicle of claim 6, said optics chamber further comprising:

a base member; and a transparent cover sealably connected to said base member and surrounding said light engine housing, thereby preventing the ingress of said foreign materials into said optics chamber.

8. The headlamp assembly for a vehicle of claim 7, wherein said base member is opaque.

9. The headlamp assembly for a vehicle of claim 6, said plenum chamber further comprising:

a rear housing;

at least one inlet formed as part of said rear housing; and at least one outlet formed as part of said rear housing, said at least one outlet in fluid communication with said at least one inlet such that air traverses said plenum chamber through said at least one outlet and said at least one inlet to remove heat from said light engine.

10. The headlamp assembly for a vehicle of claim 9, further comprising:

a flange extending from said light engine housing;

a bellows, said flange connected to an inner edge of said bellows; and an annular connector member, said outer edge of said bellows connected to said annular connector member, and said base member and said rear housing being connected to said annular connector to form said plenum chamber.

11. The headlamp assembly for a vehicle of claim 10, wherein said aiming mechanism is connected to said flange and said rear housing, and said flange of said light engine housing is positioned within said headlamp assembly through the use of said aiming mechanism.

12. The headlamp assembly for a vehicle of claim 10, wherein said aiming mechanism is operable to position said light engine and said lens with respect to said rear housing and said base member, thereby directing light from said light engine and said lens out of said optics chamber.

13. The headlamp assembly for a vehicle of claim 9, further comprising a heat rejection structure disposed in said plenum chamber, said heat rejection structure being in thermal contact with said light engine such that said heat rejection structure is operable to remove heat from said light engine as air traverses said plenum chamber.

14. The headlamp assembly for a vehicle of claim 13, said heat rejection structure further comprising a set of cooling fins.

15. The headlamp assembly for a vehicle of claim 6, wherein said light engine is mounted to said light engine housing such that the entry of said foreign materials into said closed volume is prohibited.

* * * * *